(12) United States Patent
Hashizume et al.

(10) Patent No.: US 7,281,258 B2
(45) Date of Patent: Oct. 9, 2007

(54) DISC CARTRIDGE

(75) Inventors: Kenji Hashizume, Tokyo (JP); Akio Momoi, Tokyo (JP)

(73) Assignee: TDK Corporation, Tokyo (JP)

( * ) Notice: Subject to any disclaimer, the term of this patent is extended or adjusted under 35 U.S.C. 154(b) by 306 days.

(21) Appl. No.: 11/189,799

(22) Filed: Jul. 27, 2005

(65) Prior Publication Data

US 2006/0026624 A1    Feb. 2, 2006

(30) Foreign Application Priority Data

Aug. 2, 2004  (JP) ............................. 2004-225421

(51) Int. Cl.
   *G11B 23/03*   (2006.01)
(52) U.S. Cl. ...................... 720/739; 360/133
(58) Field of Classification Search ................ 360/133; 720/739, 738, 616, 643
   See application file for complete search history.

(56) References Cited

U.S. PATENT DOCUMENTS 6,700,741 B2 *   3/2004   Inoue et al. ................. 360/133

FOREIGN PATENT DOCUMENTS

JP       2003-123426       4/2003

OTHER PUBLICATIONS

English language Abstract of JP 2003-123426.
U.S. Appl. No. 11/119,892 to Hashizume et al., which was filed on May 3, 2005.

* cited by examiner

*Primary Examiner*—Allen Cao
(74) *Attorney, Agent, or Firm*—Greenblum & Bernstein, P.L.C.

(57) ABSTRACT

A disc cartridge which is capable of positively closing a disc access opening by shutter members. In the disc cartridge, a lower shell is formed with urging protuberances for urging shutter members in a manner causing the shutter members to pivotally move toward respective closing positions, and the shutter members are each formed with a protruding portion protruded from a side end face thereof such that a force for pressing the protruding portion against the urging protuberance is progressively increased after the protruding portion is brought into abutment with the urging protuberance before completion of a pivotal motion of a disc tray until the completion of the pivotal motion of the disc tray.

8 Claims, 8 Drawing Sheets

DISC CARTRIDGE

BACKGROUND OF THE INVENTION

1. Field of the Invention

The present invention relates to a disc cartridge configured to be capable of accessing a disc-shaped recording medium accommodated within a cartridge body via an disc access opening.

2. Description of the Related Art

A disc cartridge of the above-mentioned kind is disclosed in Japanese Laid-Open Patent Publication (Kokai) No. 2003-123426, which contains an information recording medium within a cartridge housing thereof. This disc cartridge includes a disc-shaped information recording medium, a cartridge housing having an upper shell and a lower shell, an inner shell serving as a disc tray, and a pair of shutter members (shutters) arranged between the inner shell and the lower shell. The lower shell has a disc access opening formed therein for allowing access to the information recording medium contained in the disc cartridge, and is attached to the upper shell. The inner shell has a disc access opening formed therein such that it has the same shape and size as those of the disc access opening of the lower shell, and is pivotally accommodated within the cartridge housing in a manner sandwiched between the upper shell and the lower shell. When the disc cartridge is loaded in and discharged from a recording and reproduction device, the inner shell is pivotally moved relative to the cartridge housing by the recording and reproduction device, to thereby open and close part of the disc access opening of the lower shell. The shutter members are pivotally supported on the inner shell, and pivotally moved relative to the inner shell by pivotal motion of the inner shell. Further, the pair of shutter members are pivotally moved in accordance with the pivotal motion of the inner shell, and brought into abutment with each other to open and close another part of the disc access opening of the lower shell, thereby opening and closing the disc access opening in cooperation with the inner shell. Thus, in this disc cartridge, when it is loaded in the recording and reproduction device, the disc access opening is opened to allow access to the information recording medium, and when it is discharged from the recording and reproduction device, the opening is closed by the inner shell and the shutter members to restrict access to the information recording medium.

From the study of the disc cartridge described above, the present inventors found out the following points for improvement: The disc cartridge is configured such that when it is discharged, the inner shell is pivotally moved relative to the cartridge housing by the recording and reproduction device, thereby causing the pair of shutter members to be pivotally moved relative to the inner shell, whereby the opening is closed by the inner shell and the shutter members. In this case, to pivotally move the inner shell relative to the cartridge housing smoothly, it is necessary to provide in advance a certain degree of gap between the cartridge housing and the inner shell. Similarly, to pivotally move the shutter members relative to the inner shell smoothly, it is necessary to provide in advance a certain amount of gap at the pivotally supported portions (between a shaft and shaft holes) of the shutter members supported on the inner shell. This produces slight play between the cartridge housing and the inner shell, and between the inner shell and the shutter members. As a result, in the conventional disc cartridge, the shutter members, which are in a closed state in which they are brought into abutment with each other to close the opening, are sometimes slightly moved (pivotally moved) with respect to the inner shell. This sometimes produces a small gap between the shutter members. Therefore, the conventional disc cartridge suffers from the problem that dust can enter the cartridge housing due to the gap formed between the shutter members.

SUMMARY OF THE INVENTION

The present invention has been made in view of these problems, and a main object thereof is to provide a disc cartridge which is capable of positively closing a disc access opening formed therein with shutter members thereof.

To attain the above object, in a first aspect of the present invention, there is provided a disc cartridge comprising a cartridge body that includes a lower shell formed with a first opening for use in disc access, and an upper shell, and accommodates a disc-shaped recording medium, a disc tray that is formed with a second opening for use in disc access and is pivotally disposed within the cartridge body, the disc tray closing a part of the first opening when the disc cartridge is in a disc access-restricting state for restricting disc access, and having the second opening communicated with the first opening to open the part of the first opening when the disc cartridge is in a disc access-allowing state for allowing disc access, and a shutter member that is disposed between the disc tray and the lower shell in a state pivotally supported on the disc tray, the shutter member being pivotally moved relative to the disc tray in accordance with a pivotal motion of the disc tray while being moved within the cartridge body, whereby the shutter member is placed in a closing position for closing another part of the first opening in the disc access-restricting state to close the first opening in cooperation with the disc tray, and is placed in an opening position for opening another part of the first opening in the disc access-allowing state, wherein the lower shell is formed with one of a pivotal motion protrusion and a pivotal motion guide groove, for pivotally moving the shutter member with respect to the disc tray between the closing position and the opening position in accordance with the pivotal motion of the disc tray, and an urging protuberance for having the shutter member urged thereon, when the disc tray is pivotally moved so as to place the disc cartridge in the disc access-restricting state, thereby urging the shutter member such that the shutter member is caused to move toward the closing potion, and wherein the shutter member is formed with the other of the pivotal motion protrusion and the pivotal motion guide groove, and a protruding portion formed to protrude from a side end face of the shutter member such that the protruding portion is brought into abutment with the urging protuberance before completion of the pivotal motion of the disc tray when the shutter member is moved so as to place the disc cartridge in the disc access-restricting state, and that a force for pressing the protruding portion against the urging protuberance is progressively increased until the pivotal motion of the disc tray is completed thereafter.

To attain the above object, in a second aspect of the present invention, there is provided a disc cartridge comprising a cartridge body that includes a lower shell formed with a first opening for use in disc access, and an upper shell, and accommodates a disc-shaped recording medium, a disc tray that is formed with a second opening for use in disc access and is pivotally disposed within the cartridge body, the disc tray closing a part of the first opening when the disc cartridge is in a disc access-restricting state for restricting disc access, and having the second opening communicated with the first opening to open the part of the first opening when the disc cartridge is in a disc access-allowing state for allowing disc access, and a shutter member that is disposed between the disc tray and the lower shell in a state pivotally supported on the disc tray, the shutter member being pivotally moved relative to the disc tray in accordance with a pivotal motion of the disc tray while being moved within the cartridge body, whereby the shutter member is placed in a closing position for closing another part of the first opening in the disc access-restricting state to close the first opening in cooperation with the disc tray, and is placed in an opening position for opening another part of the first opening in the disc access-allowing state, wherein the lower shell is formed with one of a pivotal motion protrusion and a pivotal motion guide groove, for pivotally moving the shutter member with respect to the disc tray between the closing position and the opening position in accordance with the pivotal motion of the disc tray, and an urging protuberance for having the shutter member urged thereon, when the disc tray is pivotally moved so as to place the disc cartridge in the disc access-restricting state, thereby urging the shutter member such that the shutter member is caused to move toward the closing potion, and wherein the shutter member is formed with the other of the pivotal motion protrusion and the pivotal motion guide groove, and a protruding portion protruding from a side end face of the shutter member such that the protruding portion is brought into abutment with the urging protuberance, and wherein a portion of a surface of the protruding portion extending between a foremost end thereof and the side end face is brought into abutment with the urging protuberance, the portion being formed to be planar.

According to these disc cartridges, a lower shell is formed with an urging protuberance for urging a shutter member in a manner causing the shutter member to pivotally move toward a closing position, and the shutter member is formed with a protruding portion (whose surface between a foremost end and a side end face of the shutter member is formed to be planar) protruded from a side end face thereof such that a force for pressing the protruding portion against the urging protuberance is progressively increased after the protruding portion is brought into abutment with the urging protuberance before completion of a pivotal motion of a disc tray until the completion of the pivotal motion of the disc tray. Therefore, according to the disc cartridge of the present invention, even if a small gap for facilitating the opening and closing of a first opening is provided between a cartridge body and the disc tray or between the disc tray and the shutter member, the shutter member is urged toward a closing position by the urging protuberance, whereby the first opening is closed without forming any crevice, and therefore it is possible to positively prevent dust from entering the disc cartridge through the first opening.

Preferably, the protruding portion is configured to be brought into surface contact with the urging protuberance in the disc access-restricting state. With the configuration of this preferred embodiment, it is possible to positively urge the shutter member toward the closing position, thereby making it possible to more positively prevent dust from entering the disc cartridge through the first opening.

Preferably, the shutter member is pivotally supported on the disc tray in the vicinity of the first opening of the lower shell at predetermined locations of the disc tray with which the shutter member overlaps in a direction of thickness of the cartridge body in the disc access-restricting state, and the protruding portion is formed in the vicinity of a portion of the shutter member pivotally supported on the disc tray, the urging protuberance being formed in the vicinity of an opening edge of the first opening of the lower shell. With the configuration of this preferred embodiment, differently from the case where a portion of the shutter member far away from the portion supported by the disc tray is urged, it is possible to urge the shutter member through a very short stroke by the urging protuberance, thereby realizing a large pivotal motion of the shutter member with respect to the disc tray.

More preferably, a pair of the shutter members are pivotally supported on the disc tray, and the lower shell is configured to be formed with a pair of the urging protuberances, the urging protuberances urging respective protruding portions of the shutter members such that the shutter members are pressed against each other. With the configuration of this preferred embodiment, compared e.g. with a disc cartridge configured to urge only one shutter member, the shutter members can be brought into intimate contact with each other to thereby close the first opening without forming any crevice. This makes it possible to more positively prevent dust from entering the disc cartridge through the first opening.

It should be noted that the present disclosure relates to the subject matter included in Japanese Patent Application No. 2004-225421 filed Aug. 2, 2004, and it is apparent that all the disclosures therein are incorporated herein by reference.

BRIEF DESCRIPTION OF THE DRAWINGS

These and other objects and features of the present invention will be explained in more detail below with reference to the attached drawings, wherein.

DESCRIPTION OF THE PREFERRED EMBODIMENT

The present invention will now be described in detail with reference to the accompanying drawings showing a preferred embodiment thereof.

First, a description will be given of the construction of a disc cartridge 1 according to the present embodiment with reference to the drawings.

Figure 1:
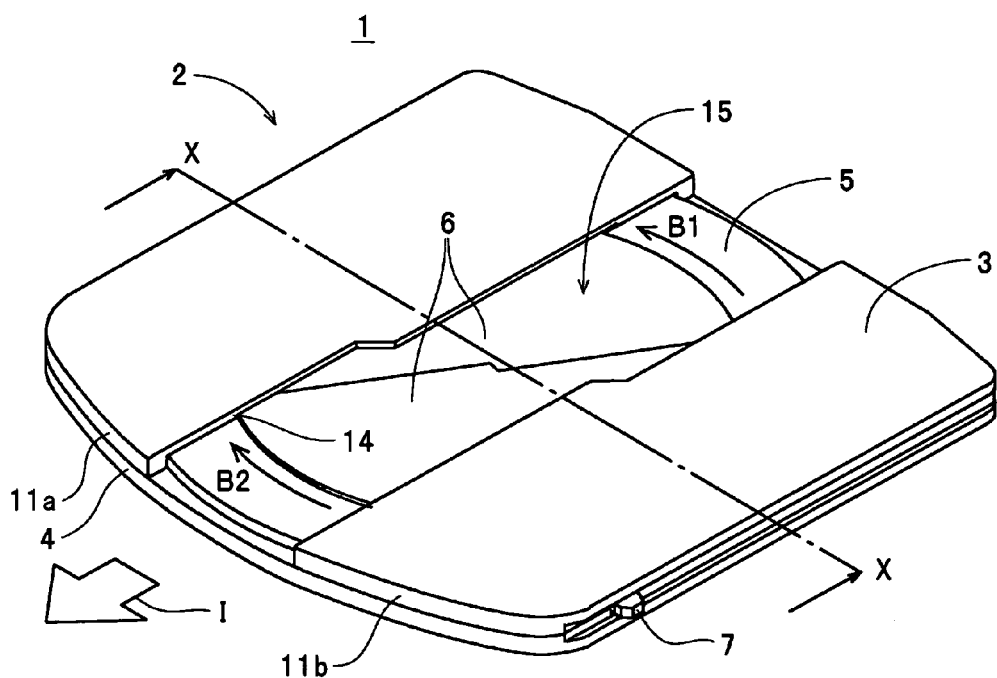
FIG. 1 is a perspective view of the appearance of a disc cartridge.
Figure 2:
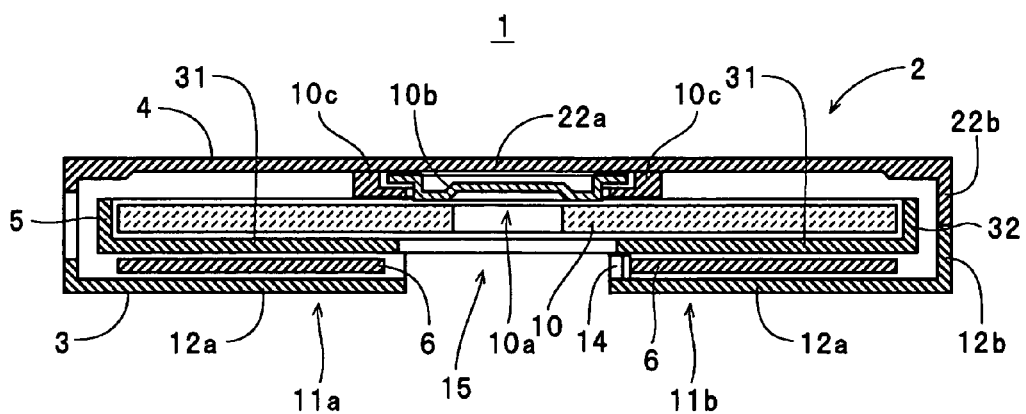
FIG. 2 is a cross-sectional view of the disc cartridge in a state where an opening is open, taken on line X-X of FIG. 1.

As shown in FIGS. 1 and 2, the disc cartridge 1 is a cartridge type information recording medium configured to be capable of recording and reproducing various recording data, and is comprised of a cartridge body 2, a disc tray 5, shutter members 6 and 6, and an optical disc 10 contained in the cartridge body 2. It should be noted that in FIG. 2, the size of the disc cartridge 1 in the direction of thickness thereof is shown in an exaggerated manner for ease of understanding of the present invention. In this case, the optical disc 10 is a single-sided rewritable disc-shaped recording medium, for example, and as shown in FIG. 2, has a central portion formed with a central hole 10a having a diameter of approximately 15 mm, for being clamped on a recording and reproduction device (not shown). The optical disc 10 is clamped on the recording and reproduction device when a disc-shaped clamping plate 10b attached to an upper shell 4 of the cartridge body 2 is attracted toward a lower shell 3 by the recording and reproduction device. On the other hand, as shown in FIGS. 1 and 2, the cartridge body 2 has the lower shell 3 and the upper shell 4 formed such that they can be fitted to each other (overlaid upon each other).

Figure 3:
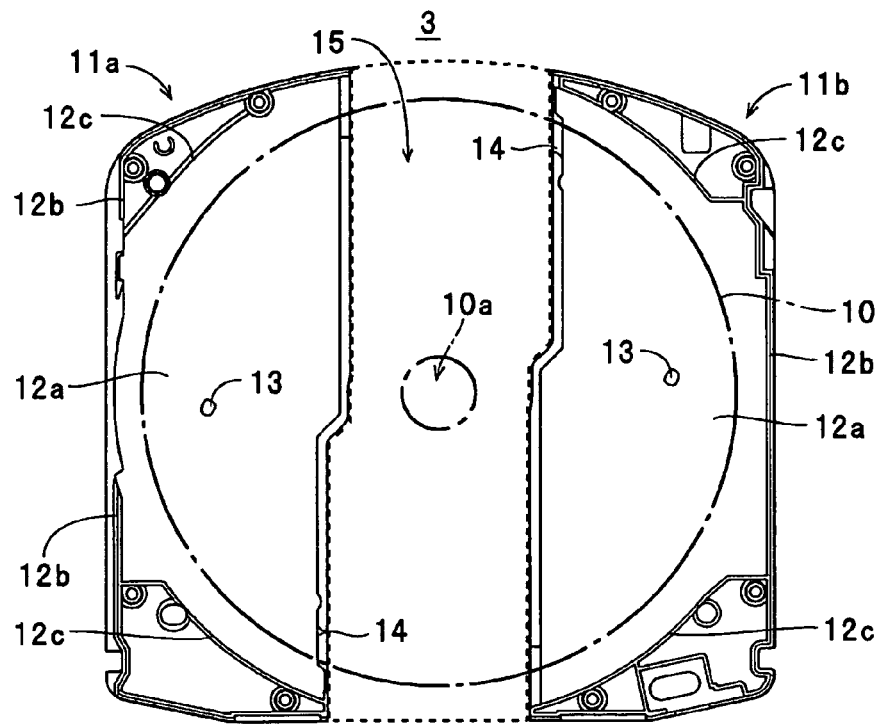
FIG. 3 is a plan view of a lower shell, as viewed from an inner side thereof.

Referring to FIG. 3, the lower shell 3 includes a pair of lower shell bodies 11a and 11b, and is formed e.g. by injection molding of a polycarbonate (or an ABS resin, etc.). More specifically, the lower shell 3 (lower shell bodies 11a and 11b) is comprised of bottom boards 12a, side walls 12b erected on the outer periphery of the bottom boards 12a to form sides of the cartridge body 2, and partition walls 12c defining a disc-accommodating space within the cartridge body 2. Further, the lower shell 3 is configured to have a disc access opening 15 formed between the respective bottom boards 12a and 12a of the lower shell bodies 11a and 11b in a state in which the lower shell 3 is fitted to the upper shell 4 (in a state in which the lower and upper shells 3 and 4 are integrated by being overlaid to each other). In this case, the opening 15 corresponds to a first opening in the present invention, and the width and the length thereof are defined so as to make it possible to perform disc access to the optical disc 10 within the cartridge body 2 (for the recording and reproduction device to perform clamping of the optical disc 10, irradiation of a laser beam via the optical head, etc.).

Figure 4:
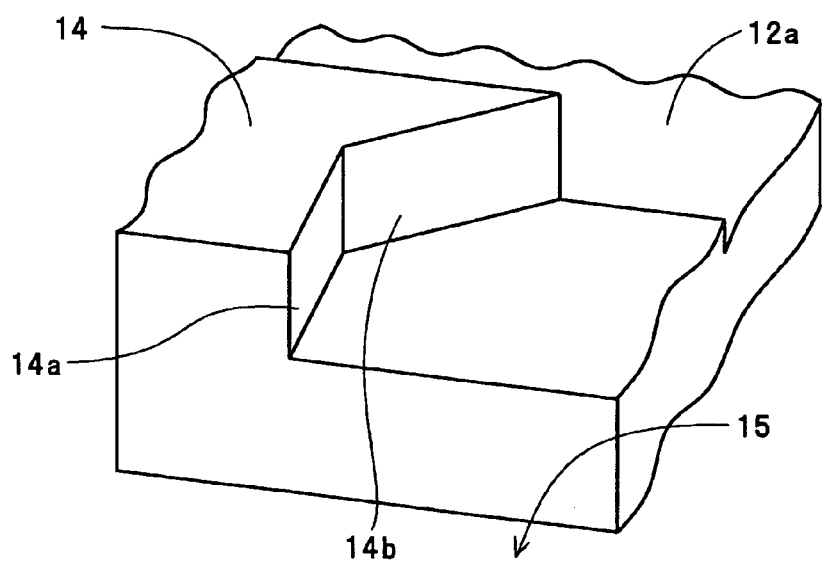
FIG. 4 is a perspective view of a protuberance and its vicinity of lower shell bodies.
Figure 9:
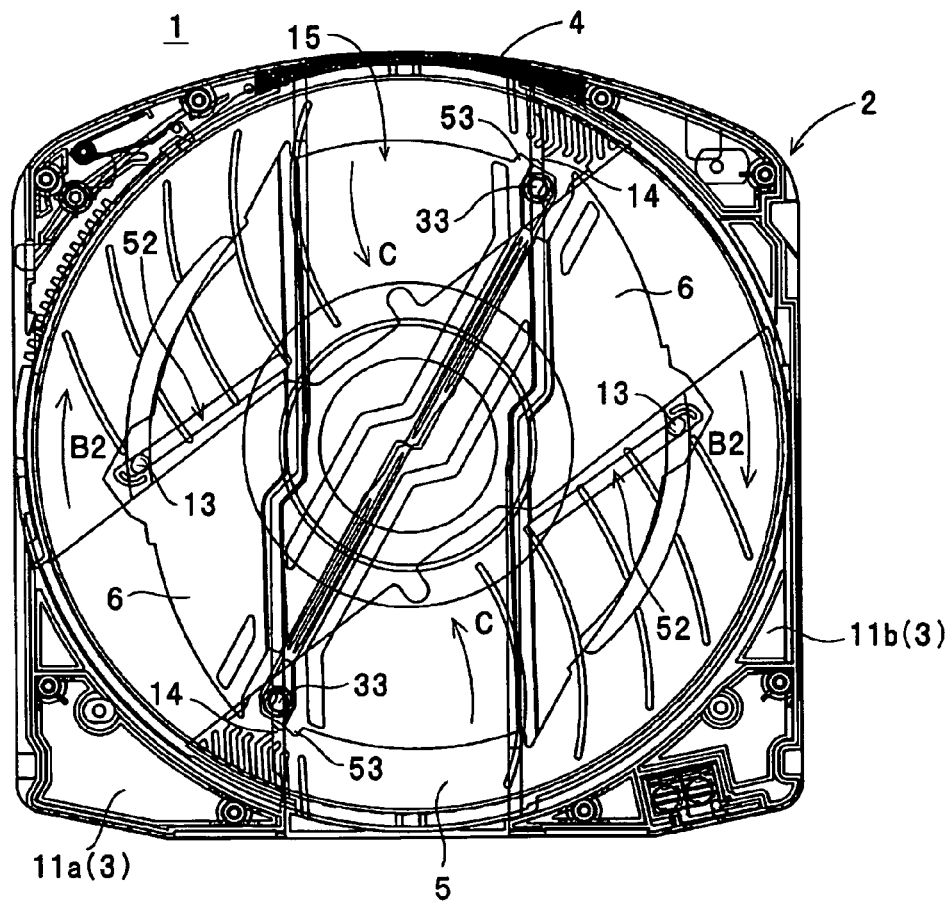
FIG. 9 is a plan view of the disc cartridge in a state where the disc tray is rotated to a restricted position, which shows members inside in a transparent view.

More specifically, as shown in FIG. 3, the opening 15 is formed to have a belt-like shape which extends from an outer edge on one side of the lower shell 3 (an upper edge as viewed in FIG. 3) to an outer edge on another side of the lower shell 3 (a lower edge as viewed in FIG. 3) opposite to the one side across the central portion. The opening 15 is thus formed to have a shape and a size large enough to expose a pair of belt-like areas of the optical disc 10 received in the cartridge body 2, which extend from a central area of the optical disc 10 to outer peripheral areas thereof on respective sides opposite to each other across the central area including the neighboring area of the central hole 10a. By virtue of this configuration, the disc cartridge 1 is capable of simultaneously recording and reproducing data on and from the optical disc 10 using two optical heads. Further, erected on each of the bottom boards 12a of the lower shell bodies 11a and 11b is a pivotal motion protrusion 13 for pivotally moving a shutter member 6 (hereinafter also simply referred to as "the protrusion 13"). The protrusions 13 are inserted into respective associated slits 52 (see FIG. 9) of the shutter members 6 so as to cause the shutter members 6 to be slid in accordance with the pivotal motion of the disc tray 5, as will be described hereinafter. Furthermore, a protuberance 14 corresponding to an urging protuberance in the present invention is formed on each of the bottom boards 12a of the lower shell bodies 11a and 11b. In this case, as shown in FIG. 4, the protuberances 14 are each formed in an edge of the bottom boards 12a facing toward the opening 15 (toward the viewer as viewed in FIG. 4) in a manner protruded toward the inside of the cartridge body 2 (an upper side as viewed in FIG. 4).

Figure 5:
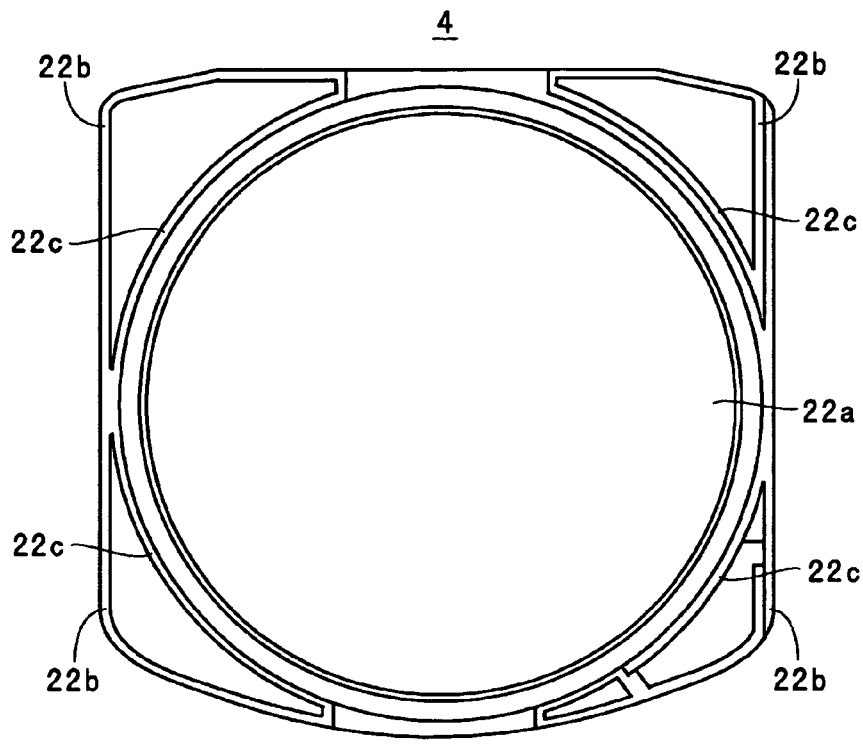
FIG. 5 is a plan view of an upper shell, as viewed from an inner side thereof.

As shown in FIG. 5, the upper shell 4 is comprised of top board 22a, side walls 22b erected on the outer periphery of the top board 22a to form sides of the cartridge body 2 in cooperation with the side walls 12b of the lower shell 3, and partition walls 22c defining the disc-accommodating space within the cartridge body 2 in cooperation with the partition walls 12c of the lower shell 3. The upper shell 4 is formed e.g. by injection molding of a transparent polycarbonate. Further, as shown in FIG. 2, the clamping plate 10b is mounted on the central portion of the upper shell 4 by an annular mounting member 10c. In this case, the clamping plate 10b is mounted in a manner rotatable relative to the upper shell 4 and slightly movable in a direction toward or away from the top board 22a.

Figure 6:
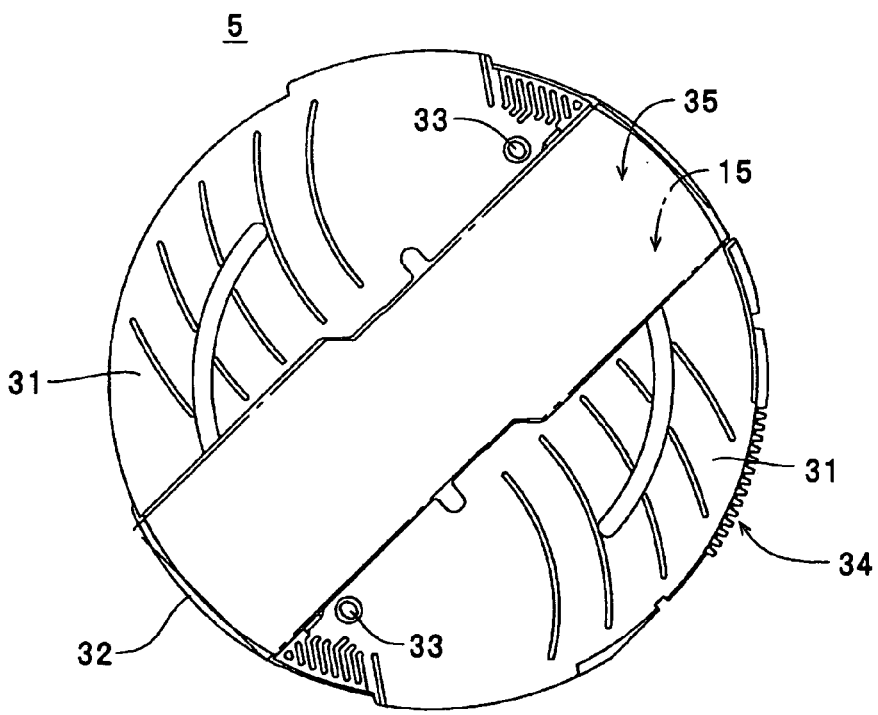
FIG. 6 is a plan view of a disc tray, as viewed from the lower shell 3.
Figure 11:
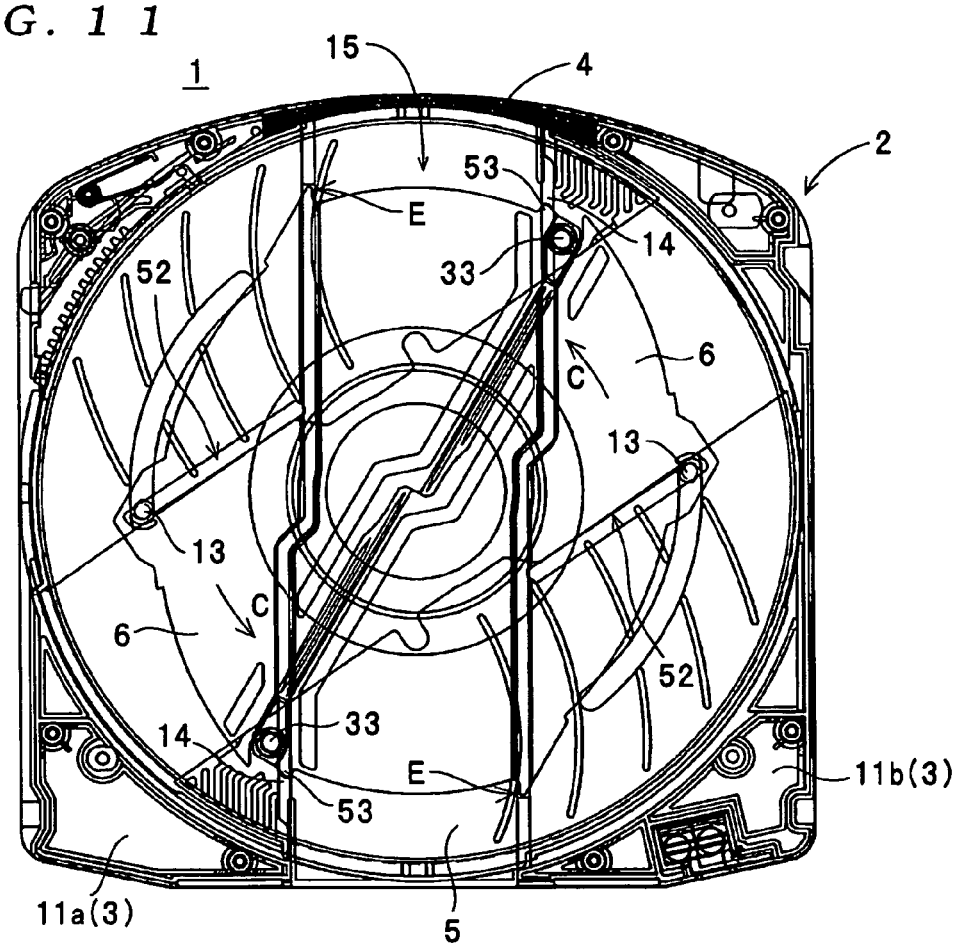
FIG. 11 is a plan view the disc cartridge in the disc access-restricting state, which shows members inside in a transparent view.

Referring to FIG. 6, the disc tray (inner rotor) 5 is formed by a disc-shaped bottom board 31 formed with an opening 35, and a side wall 32 erected on the outer periphery of the bottom board 31 such that the disc tray 5 is shallow plate-shaped and is capable of receiving the optical disc 10 placed thereon. As shown in FIG. 2, the disc tray 5 is accommodated within the cartridge body 2 such that it is pivotally movable together with the optical disc 10. In this case, the opening 35 corresponds to a second opening in the present invention, and as shown in FIG. 6, it is formed to have approximately the same width as the width of the opening 15 of the lower shell 3. It should be noted that in FIG. 6, the opening edge of the opening 15 is indicated by a one-dot chain line. Further, the side wall 32 is formed with meshing teeth 34 with which a shutter opening/closing mechanism (not shown) of the recording and reproduction device can mesh. Furthermore, the side wall 32 is formed with a cutaway portion with which a lock member 7 (see FIG. 1) is engaged in a disc access-restricting state for restricting access to the optical disc 10 and in a disc access-allowing state for allowing access to the optical disc 10, to thereby restrict pivotal motion of the disc tray 5 within the cartridge body 2, and a cutaway portion (not shown) with which the shutter opening/closing mechanism of the recording and reproduction device is engaged for pivotally moving the disc tray 5. Further, support shafts 33 and 33 for axially supporting the shutter members 6 and 6 are erected on the lower surface of the bottom board 31, respectively. In this case, as shown in FIG. 11, when the disc tray 5 is pivotally moved in the disc access-restricting state, the support shafts 33 and 33 are placed at respective predetermined locations in the vicinity of the opening edge of the opening 15 of the lower shell bodies 11a and 11b. The support shafts 33 and 33 and overlap with the vicinity of the opening edge of the opening 15 of the lower shell bodies 11a and 11b.

Figure 7:
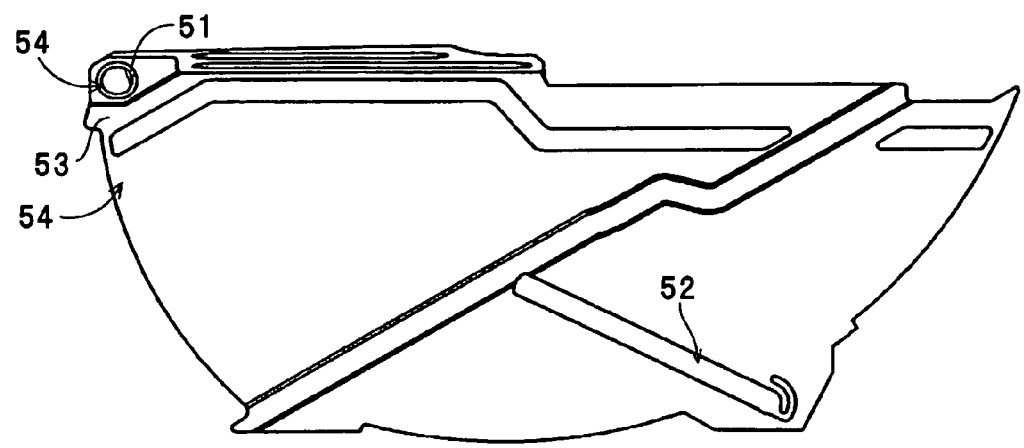
FIG. 7 is a plan view of a shutter member 6, as viewed from the lower shell.
Figure 8:
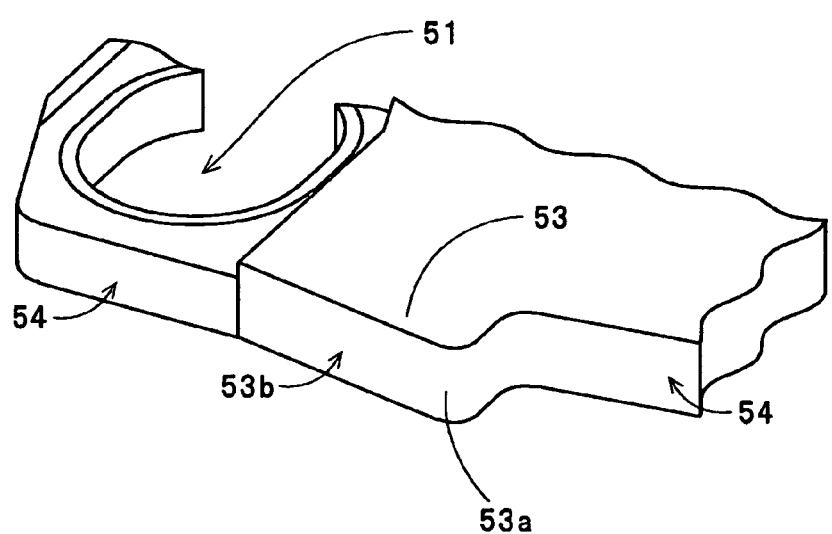
FIG. 8 is a perspective view of a protruding portion and its vicinity of the shutter member.
Figure 12:
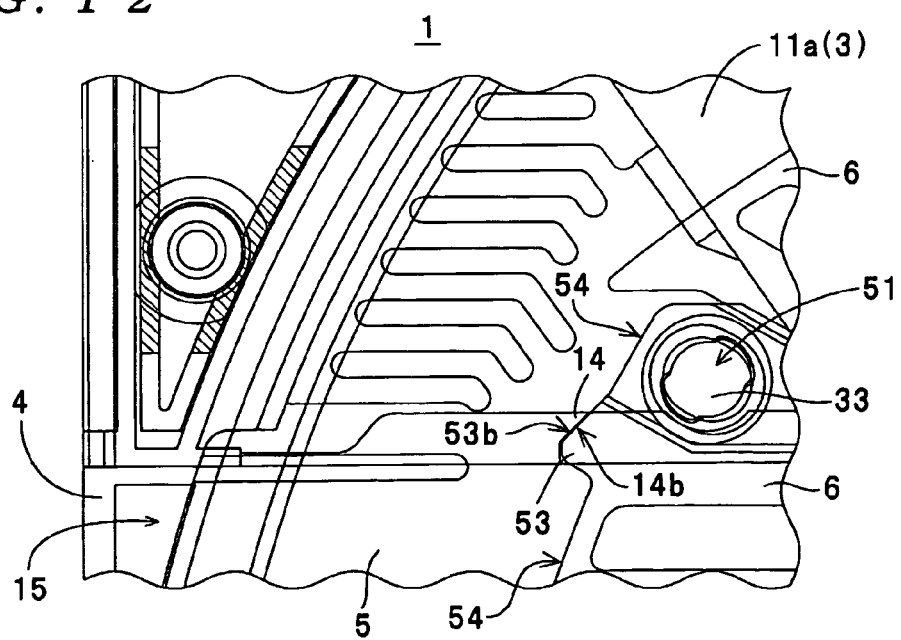
FIG. 12 is a fragmentary plan view of the protuberance and the protruding portion and their vicinity in the state of the disc cartridge shown in FIG. 11.

As shown in FIG. 7, each shutter member 6 has one end formed with a bearing hole 51 through which the support shaft 33 of the disc tray 5 can be inserted, and the other end formed with a slit 52 (a pivotal motion guide groove in the present invention) through which the protrusion 13 of the lower shell 3 can be inserted. Further, a protruding portion 53 is formed in the vicinity of the bearing hole 51 of the shutter member 6. In this case, as shown in FIG. 8, the protruding portion 53 is protruded from a side end face 54 of the shutter member 6, and has a sloping surface 53b ("a face between the foremost end and the side end face" in the present invention) formed to be planar between a foremost end 53a thereof and the side end face 54. Further, the protruding portion 53 is formed such that when the disc tray 5 is pivotally moved for placing the disc cartridge 1 in the disc access-restricting state, as will be described hereinafter, the sloping surface 53b is brought into abutment with the protuberance 14 before completion of the pivotal motion of the disc tray 5, and a force for pressing the sloping surface 53b against the protuberance 14 progressively increases as the disc tray 5 is further pivotally moved from this state until the pivotal motion is completed. Furthermore, as shown in FIG. 12, the protruding portion 53 is formed such that the sloping surface 53b is in surface contact with an abutment surface 14b of the protuberance 14 of the lower shell body 11a when the disc cartridge is in a normal state where the shutter member 6 restricts access to the optical disc 10. Further, an abutment surface 14b of the protuberance 14 of the lower shell body 11b is also configured such that the sloping surface 53b of the protruding portion 53 of the shutter member 6 is brought into surface contact therewith. Furthermore, as shown in FIG. 2, the shutter member 6 is contained in the cartridge body 2 in a manner sandwiched between the lower shell 3 and the disc tray 5, with the support shaft 33 of the disc tray 5 being inserted through the bearing hole 51, whereby the shutter member 6 is pivotally supported on the disc tray 5, as shown in FIG. 12. Further, as will be described hereinafter, in the disc access-restricting state, the shutter members 6 and 6 close the other part, described hereinafter, of the opening 15 by being urged by the protruding portion 53 and 53 of the lower shell bodies 11a and 11b in a manner pressed against each other.

Next, a method of using the disc cartridge 1 will be described with reference to drawings.

Referring to FIG. 1, when the disc cartridge 1 is in a normal state where it is removed from the recording and reproduction device, the opening 15 of the lower shell 3 is closed by the disc tray 5 and the shutter members 6 and 6, thereby restricting access to the optical disc 10 within the cartridge body 2 (disc access-restricting state in the present invention). More specifically, areas of the opening 15 on the longitudinally opposite end sides thereof (opening portions for exposing outer peripheral portions of the optical disc 10: parts in the present invention) are closed by the bottom board 31 of the disc tray 5, and a longitudinally central area of the opening 15 (an opening portion for exposing the neighboring area of the central hole 10a of the optical disc 10: the other part, described above, in the present invention) is closed by the shutter members 6 and 6. As a result, the whole area of the opening 15 is closed by the disc tray 5 and the shutter members 6 and 6.

On the other hand, when the disc cartridge 1 is used (for recording and reproduction of recording data), the disc cartridge 1 is loaded in the recording and reproduction device. In doing this, when the disc cartridge 1 is pressed into the recording and reproduction device to some extent, the recording and reproduction device draws in the disc cartridge 1 in a direction indicated by an arrow I shown in FIG. 1. It should be noted that although in FIG. 1, the lower shell 3 is shown in a state facing upward, the disc cartridge 1 in actual use is loaded in the recording and reproduction device with the upper shell 4 facing upward. In doing this, first, when the shutter opening/closing mechanism of the recording and reproduction device is brought into abutment with the lock member 7, restriction of the pivotal motion of the disc tray 5 by the lock member 7 is cancelled. Then, when the disc cartridge 1 is further drawn into the recording and reproduction device, the shutter opening/closing mechanism is caused to mesh with the meshing teeth 34 of the disc tray 5, and the disc cartridge 1 in this state is further drawn in, whereby the disc tray 5 is pivotally moved relative to the cartridge body 2 in a direction indicated by an arrow B1 shown in FIG. 1. At this time, the pivotal motion protrusions 13 of the lower shell 3 are relatively slid within the associated slits 52 of the shutter members 6 in accordance with the pivotal motion of the disc tray 5, whereby the shutter members 6 are pivotally moved about the respective bearing holes 51 (the support shafts 33 of the disc tray 5) with respect to the disc tray 5, for being slid relative to the lower shell 3. Thus, the opening 15 of the lower shell 3 and the opening 35 of the disc tray 5 are communicated with each other in the direction of the thickness of the disc cartridge 1, and the shutter members 6 and 6 are retracted from the opening 35 to be placed in opening positions in the present invention, whereby access to the optical disc 10 within the cartridge body 2 is allowed (disc access-allowing state in the present invention). After that, the clamping plate 10b is magnetically attracted by the recording and reproduction device, whereby the opening edge of the opening 10a (central area) is clamped, and then the irradiation of the laser beam through the opening 15 (recording or reproduction of recording data) is carried out.

Figure 10:
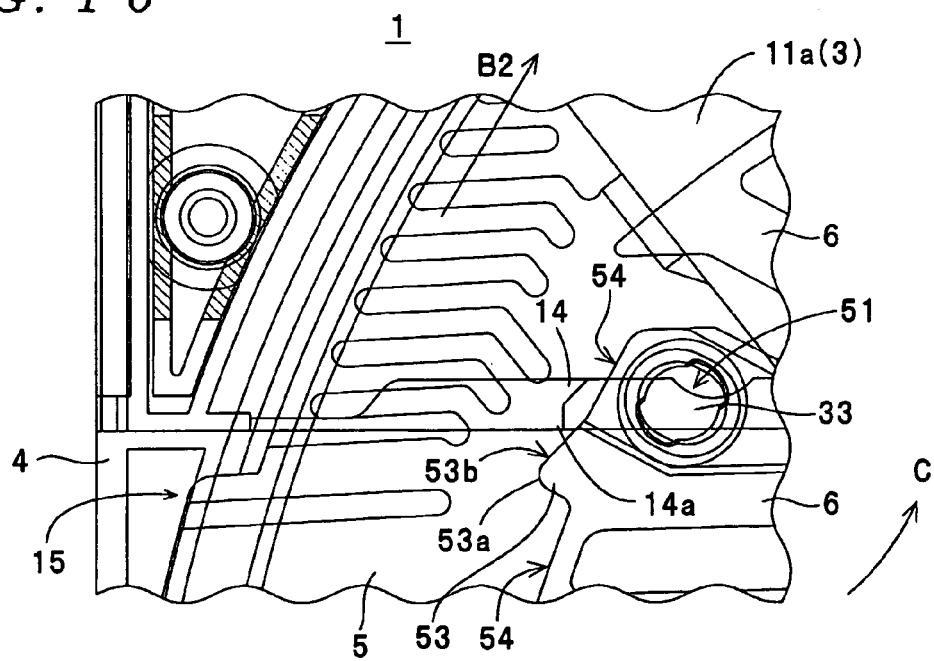
FIG. 10 is a fragmentary plan view of the protuberance and the protruding portion and their vicinity in the state of the disc cartridge shown in FIG. 9.

On the other hand, when the disc cartridge 1 is removed (discharged) from the recording and reproduction device after completion of recording or reproduction of recording data, the opening 15 of the lower shell 3 is closed by the disc tray 5 and the shutter members 6 and 6, whereby the disc cartridge 1 is placed in the disc access-restricting state. More specifically, when the disc cartridge 1 is discharged from the recording and reproduction device, the disc tray 5 is pivotally moved by the shutter opening/closing mechanism in a direction indicated by an arrow B2 in FIG. 9. This pivotal motion of the disc tray 5 pivotally moves the shutter members 6 with respect to the disc tray 5, whereby the shutter members 6 are slid relative to the lower shell 3. In this case, in the disc cartridge 1, before the shutter members 6 and 6 are slid to closing positions for closing the central area of the opening 15, first, the sloping surfaces 53b of the protruding portions 53 are brought into abutment with the corners 14a of the protuberances 14 from a state shown in FIG. 10. In this state, the disc tray 5 is further pivotally moved, whereby each shutter member 6 is moved in the direction indicated by an arrow B2 in a manner such that the sloping surface 53b of the protruding portion 53 is rubbed against the protuberance 14.

In doing this, since the sloping surface 53b of the protruding portion 53 is formed as a sloping surface (flat surface) progressively sloping toward the corner 14a, when the shutter member 6 is slid relative to the lower shell 3 (the lower shell body 11a) in accordance with the pivotal motion of the disc tray 5, the protruding portion 53 is brought into abutment with the protuberance 14 (corner 14a) before completion of the pivotal motion of the disc tray 5, and after that the force for pressing the protruding portion 53 against the protuberance 14 is progressively increased. Therefore, the force of the corner 14a of the protuberance 14 for urging the protruding portion 53 (shutter member 6) by counter action is progressively increased until the pivotal motion of the disc tray 5 is completed. As a result, the shutter member 6 is pivotally moved about the bearing hole 51 (support shaft 33) in a direction indicated by an arrow C shown in FIGS. 9 and 10. This places the shutter members 6 and 6 in a state urged by the protuberances 14 and 14 in a direction in which they are pressed against each other, when the shutter members 6 and 6 are in the closing positions, as shown in FIGS. 11 and 12. This causes the shutter members 6 and 6 to be brought into contact with each other intimate enough to close the opening 15, even if there exists a small gap between the bearing hole 51 and the support shaft 33 or between the disc tray 5 and the cartridge body 2. Further, as shown in FIG. 12, in the disc cartridge 1, (the sloping surface 53b of) the protruding portion 53 of the shutter member 6 and the protuberance 14 (abutment surface 14b) of the lower shell 3 are brought into surface contact with each other. Therefore, the shutter members 6 and 6 are positively urged to be brought into intimate contact with each other. This makes it possible to reliably close a gap between the shutter members 6 and 6, thereby protecting the optical disc 10 within the cartridge body 2 by the cartridge body 2, the disc tray 5, and the shutter members 6 and 6.

Figure 13:
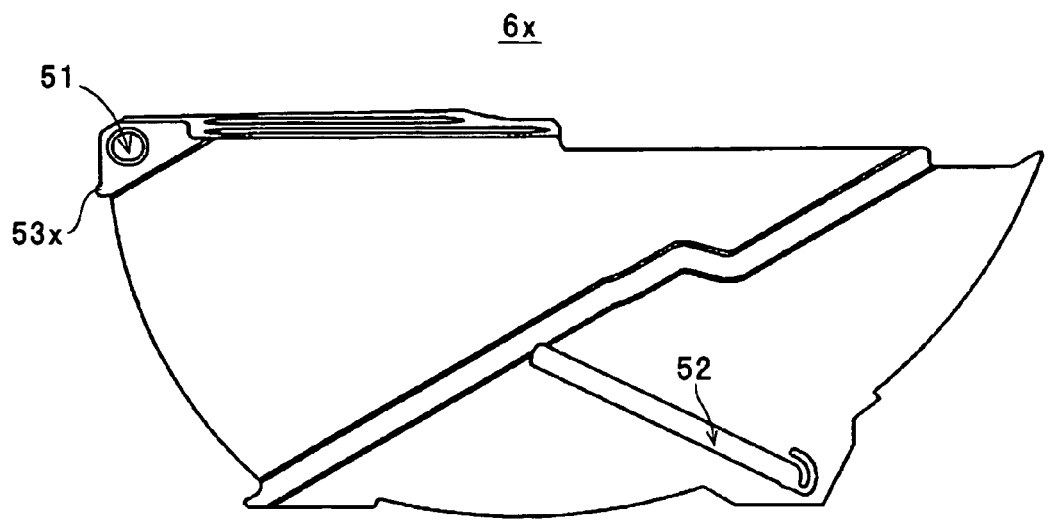
FIG. 13 is a plan view of a shutter member in an other disc cartridge invented by the same inventors of the present application.
Figure 14:
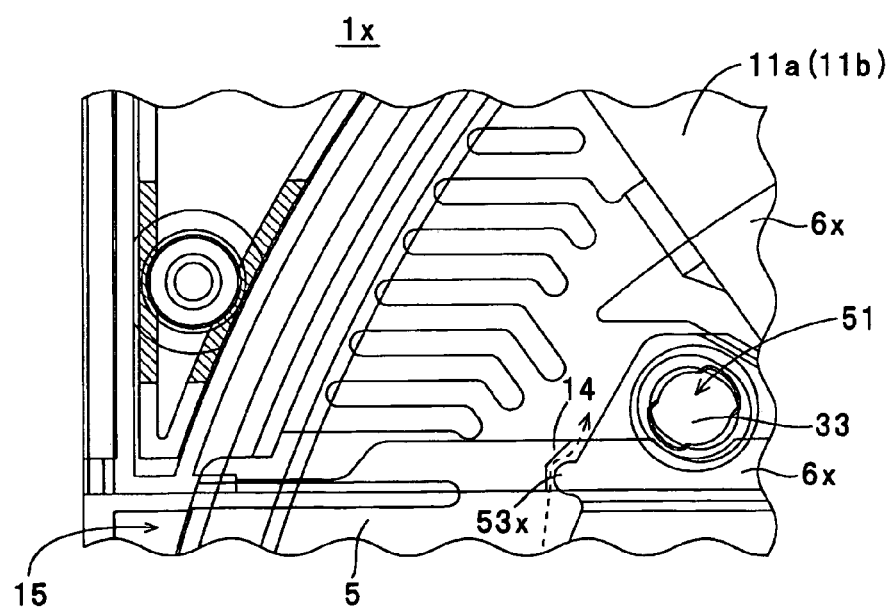
FIG. 14 is a fragmentary plan view of the protuberance and the protruding portion and their vicinity in a disc access-restricting state of a disc cartridge shown in FIG. 13.

In this case, among disc cartridges developed by the present assignee, by narrowing a gap between the lower shell bodies 11a and 11b and the shutter members 6x and 6x in the disc access-restricting state, there exists a disc cartridge 1x, as shown in FIGS. 13 and 14, which includes a protruding portion 53x each formed with shutter members 6x and 6x for preventing dust from entering the disc cartridge 1x through the gap via the route as shown by a broken line in FIG. 14. However, the shutter member 6x is configured such that the amount of protrusion of the protruding portion 53x is smaller than that of the protruding portion 53 of the above-described shutter member 6, and hence as shown in FIG. 14, the protruding portion 53x is not brought into abutment with the protuberance 14 in a state where the shutter member 6x is placed in a closing position (disc access-restricting state), whereby a gap is formed between the lower shell body 11a and 11b and the shutter member 6x and 6x. Therefore, differently from the aforementioned disc cartridge 1, the shutter members 6x and 6x are not urged by the protuberances 14 and 14 in the direction in which they are pressed against each other, and therefore the disc cartridge 1x suffers from the problem that dust can enter the cartridge body 2 due to a gap formed between the shutter members 6x and 6x, similarly to the conventional disc cartridge.

As described above, in the disc cartridge 1, the lower shell 3 (lower shell bodies 11a and 11b) is formed with the protuberances 14 and 14 for urging the shutter members 6 and 6 such that they are pivotally moved toward the closing positions, and the shutter members 6 and 6 are each formed with the protruding portion 53 (protruding portion 53 having the sloping surface 53b formed to be flat between the foremost end 53a and the side end face 54) which is protruded from the side end face 54 such that it is brought into abutment with the protuberance 14 (corner 14a) before completion of the pivotal motion of the disc tray 5, and the force for pressing the protruding portion 53 against the protuberance 14 is progressively increased until the pivotal motion of the disc tray 5 is completed. Therefore, according to the disc cartridge 1, even if a small gap for facilitating the opening and closing the opening 15 is provided between the cartridge body 2 and the disc tray 5 or between the disc tray 5 and the shutter members 6 and 6, it is possible to positively prevent dust from entering the disc cartridge through the opening 15, since the shutter members 6 and 6 are urged toward the closing positions by the protuberances 14 and 14, whereby the opening 15 is closed without forming any crevice.

Further, according to the disc cartridge 1, since the protruding portions 53 are each configured to be brought into surface contact with the protuberance 14 (abutment surface 14b) in the disc access-restricting state, it is possible to positively urge the shutter members 6 and 6 toward the closing positions, thereby making it possible to prevent dust from entering the disc cartridge 1 through the opening 15 more positively.

Furthermore, in the disc cartridge 1, the shutter members 6 and 6 are pivotally supported in the vicinity of the opening edge of the opening 15 of the lower shell 3 at respective predetermined locations of the disc tray 5 with which the shutter members 6 and 6 overlap in the disc access-restricting state, and the protruding portions 53 are formed in the vicinity of portions (bearing holes 51) of the shutter members 6 and 6 pivotally supported on the disc tray 5. Further, and the protuberances 14 are formed at respective locations of the lower shell 3, close to the opening 15. Therefore, according to the disc cartridge 1, differently from the case where portions far away from the bearing holes 51 are urged, it is possible to urge the shutter members through a very short stroke by the protuberances 14, thereby causing large pivotal motions of the shutter members 6 and 6 with respect to the disc tray 5.

Further, according to the disc cartridge 1, the lower shell 3 is formed such that the pair of protuberances 14 and 14 urge the protruding portions 53 of the respective associated shutter members 6 and 6 such that the shutter members 6 and 6 are pressed against each other, whereby e.g. compared with a disc cartridge configured to urge only one shutter member 6, the shutter members 6 and 6 can be brought into intimate contact with each other to thereby close the opening 15 without forming any crevice. This makes it possible to prevent dust from entering the disc cartridge 1 through the opening 15 more positively.

Figure 15:
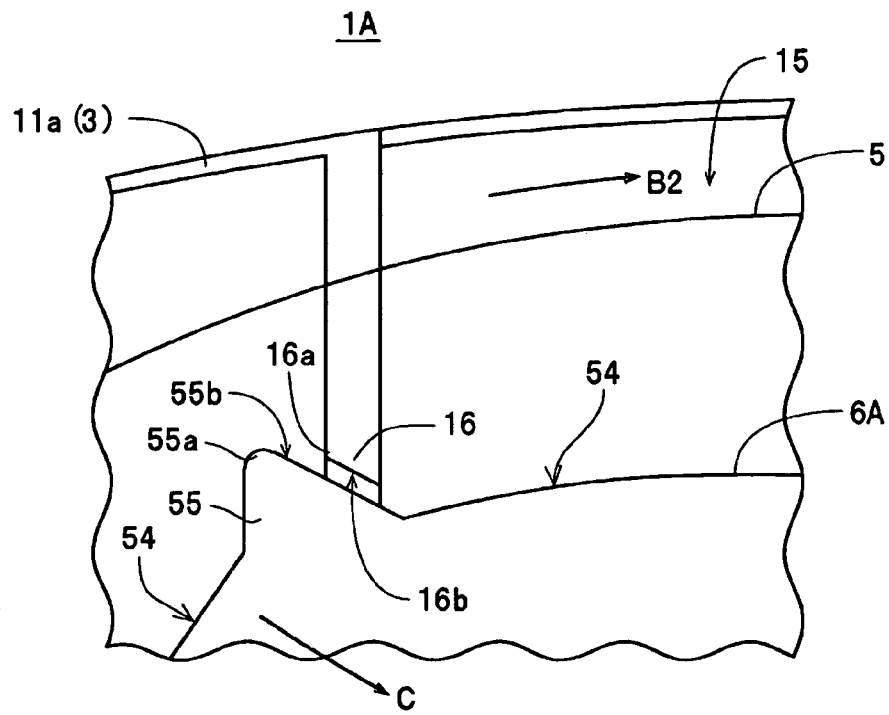
FIG. 15 is a fragmentary plan view of a protuberance and a protruding portion and their vicinity in a state of a disc cartridge of an other disc cartridge according to the present invention, in which the disc tray is rotated to a restricted position.
Figure 16:
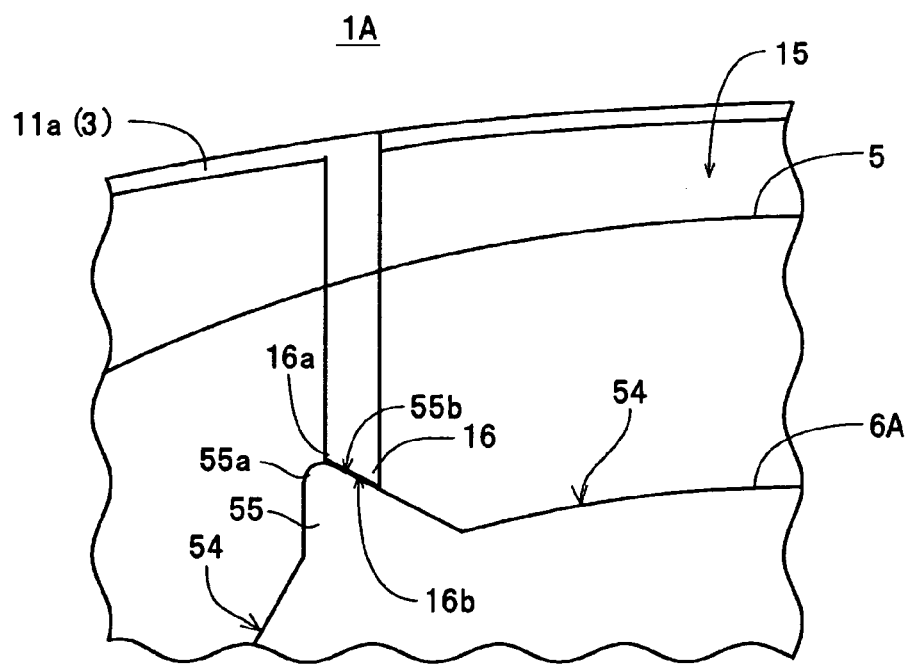
FIG. 16 is a fragmentary plan view of the protuberance and the protruding portion and their vicinity in the disc access-restricting state of the disc cartridge shown in FIG. 15.

It should be noted that the present invention is not limited to the above-described embodiment, but the configuration thereof can be modified as required. For example, although in the above-described embodiment, the disc cartridge 1 is configured such that the protruding portions 53 are formed in the vicinity of the bearing holes 51 of the shutter members 6, and protuberances 14 are formed in the vicinity of the support shafts 33 of the lower shell bodies 11a and 11b, this is not limitative. For example, a disc cartridge 1A shown in FIGS. 15 and 16 is configured such that shutter members 6A are urged at locations of the disc cartridge 1, indicated by an arrow E shown in FIG. 11. More specifically, in the disc cartridge 1A, when the cartridge 1A is discharged from the recording and reproduction device, the disc tray 5 is pivotally moved by the shutter opening/closing mechanism, and this pivotal motion of the disc tray 5 pivotally moves each shutter member 6A with respect to the disc tray 5 in a direction indicated by an arrow B2 shown in FIG. 15, whereby the shutter member 6A is slid relative to the lower shell 3 (lower shell bodies 11a and 11b). In this case, in the disc cartridge 1A, before the shutter members 6A and 6A are slid to closing positions for closing the central area of the opening 15, first, a sloping surface 55b of each protruding portion 55 is brought into abutment with a corner 16a of a protuberance 16 from a state shown in FIG. 15. In the resulting state, the disc tray 5 is further pivotally moved, whereby each shutter member 6A is moved in the direction indicated by the arrow B2 in a manner such that the sloping surface 55b of the protruding portion 55 is rubbed against the protuberance 16.

In doing this, since the sloping surface 55b of the protruding portion 55 is formed as a sloping surface (flat surface) progressively sloped toward the corner 16a, when the shutter member 6A is slid in accordance with the pivotal motion of the disc tray 5, a force for pressing the protruding portion 55 against the protuberance 16, that is, a force of the protuberance 16 urging the protruding portion 55 (shutter member 6A) is progressively increased. As a result, the shutter member 6A is pivotally moved about the bearing hole 51 (support shaft 33, not shown) in a direction indicated by an arrow C in FIG. 15 (direction toward a closing position). Therefore, as shown in FIG. 16, in a state where the shutter member 6A is placed in a closing position, the shutter member 6A and the other shutter member 6A (not shown) are urged by the protuberances 16 and 16 in a direction in which they are pressed against each other. This causes the shutter members 6A and 6A to be brought into intimate contact with each other to close the opening 15, even if there exists a small gap between the bearing hole 51 and the support shaft 33 or between the disc tray 5 and the cartridge body 2. Further, as shown in FIG. 16, in the disc cartridge 1A, the protruding portion 55 (sloping surface 55b) of the shutter member 6A and the protuberance 16 (abutment surface 16b) of the lower shell 3 are brought into surface contact with each other. As a result, the shutter members 6A are positively urged. This makes it possible to protect the optical disc 10 within the cartridge body 2 by the cartridge body 2, the disc tray 5, and the shutter members 6A and 6A.

Further, the disc-shaped recording medium, according to the present invention is not limited to the aforementioned rewritable optical disc 10, but it includes not only various optical discs, such as a reproduction-only optical disc and a write-once type optical disc, but also a magneto-optical disc and a magnetic disc. Further, although the above description is given of an example of the disc cartridge 1 in which the cartridge body 2 is formed by the lower shell 3 having the separate lower shell bodies 11a and 11b formed independently of each other, this is not limitative, but the present invention can be applied to a disc cartridge which includes a cartridge body having a single lower shell, as in the conventional disc cartridge. Further, the shape of the opening for use in disc access in the present invention is not limited to the rectangular shape which is longer in the front-rear direction of the cartridge body 2 as in the illustrated example, but it may be a rectangular shape which is longer in the lateral direction of the cartridge body, and a rectangular shape which is longer in the diagonal direction of a square-shaped cartridge body.

What is claimed is:

1. A disc cartridge comprising:
    a cartridge body that includes a lower shell formed with a first opening for use in disc access, and an upper shell, and accommodates a disc-shaped recording medium;
    a disc tray that is formed with a second opening for use in disc access and is pivotally disposed within said cartridge body, said disc tray closing a part of the first opening when said disc cartridge is in a disc access-restricting state for restricting disc access, and having the second opening communicated with the first opening to open the part of the first opening when said disc cartridge is in a disc access-allowing state for allowing disc access; and
    a shutter member that is disposed between said disc tray and said lower shell in a state pivotally supported on said disc tray, said shutter member being pivotally moved relative to said disc tray in accordance with a pivotal motion of said disc tray while being moved within said cartridge body, whereby said shutter member is placed in a closing position for closing another part of the first opening in the disc access-restricting state to close the first opening in cooperation with said disc tray, and is placed in an opening position for opening another part of the first opening in the disc access-allowing state,
    wherein said lower shell is formed with one of a pivotal motion protrusion and a pivotal motion guide groove, for pivotally moving said shutter member with respect to said disc tray between the closing position and the opening position in accordance with the pivotal motion of said disc tray, and an urging protuberance for having said shutter member urged thereon, when said disc tray is pivotally moved so as to place the disc cartridge in the disc access-restricting state, thereby urging the shutter member such that said shutter member is caused to move toward the closing potion, and
    wherein said shutter member is formed with the other of said pivotal motion protrusion and said pivotal motion guide groove, and a protruding portion formed to protrude from a side end face of said shutter member such that said protruding portion is brought into abutment with said urging protuberance before completion of the pivotal motion of said disc tray when said shutter member is moved so as to place the disc cartridge in the disc access-restricting state, and that a force for pressing said protruding portion against said urging protuberance is progressively increased until the pivotal motion of said disc tray is completed thereafter.

2. A disc cartridge as claimed in claim 1,
    wherein said protruding portion is configured to be brought into surface contact with said urging protuberance in the disc access-restricting state.

3. A disc cartridge as claimed in claim 1, wherein said shutter member is pivotally supported on said disc tray in the vicinity of the first opening of said lower shell at predetermined locations of said disc tray with which said shutter member overlaps in a direction of thickness of said cartridge body in the disc access-restricting state,
    wherein said protruding portion is formed in the vicinity of a portion of said shutter member pivotally supported on said disc tray, and
    wherein said urging protuberance is formed in the vicinity of an opening edge of the first opening of said lower shell.

4. A disc cartridge as claimed in claim 1,
    wherein a pair of said shutter members are pivotally supported on said disc tray,
    wherein said lower shell is configured to be formed with a pair of said urging protuberances, and wherein said urging protuberances urge respective protruding portions of said shutter members such that said shutter members are pressed against each other.

5. A disc cartridge comprising:

a cartridge body that includes a lower shell formed with a first opening for use in disc access, and an upper shell, and accommodates a disc-shaped recording medium;

a disc tray that is formed with a second opening for use in disc access and is pivotally disposed within said cartridge body, said disc tray closing a part of the first opening when said disc cartridge is in a disc access-restricting state for restricting disc access, and having the second opening communicated with the first opening to open the part of the first opening when said disc cartridge is in a disc access-allowing state for allowing disc access; and a shutter member that is disposed between said disc tray and said lower shell in a state pivotally supported on said disc tray, said shutter member being pivotally moved relative to said disc tray in accordance with a pivotal motion of said disc tray while being moved within said cartridge body, whereby said shutter member is placed in a closing position for closing another part of the first opening in the disc access-restricting state to close the first opening in cooperation with said disc tray, and is placed in an opening position for opening another part of the first opening in the disc access-allowing state, wherein said lower shell is formed with one of a pivotal motion protrusion and a pivotal motion guide groove, for pivotally moving said shutter member with respect to said disc tray between the closing position and the opening position in accordance with the pivotal motion of said disc tray, and an urging protuberance for having said shutter member urged thereon, when said disc tray is pivotally moved so as to place the disc cartridge in the disc access-restricting state, thereby urging the shutter member such that said shutter member is caused to move toward the closing potion, and wherein said shutter member is formed with the other of said pivotal motion protrusion and said pivotal motion guide groove, and a protruding portion protruding from a side end face of said shutter member such that said protruding portion is brought into abutment with said urging protuberance, and wherein a portion of a surface of said protruding portion extending between a foremost end thereof and said side end face is brought into abutment with said urging protuberance, said portion being formed to be planar.

6. A disc cartridge as claimed in claim 5, wherein said protruding portion is configured to be brought into surface contact with said urging protuberance in the disc access-restricting state.

7. A disc cartridge as claimed in claim 5, wherein said shutter member is pivotally supported on said disc tray in the vicinity of the first opening of said lower shell at predetermined locations of said disc tray with which said shutter member overlaps in a direction of thickness of said cartridge body in the disc access-restricting state, wherein said protruding portion is formed in the vicinity of a portion of said shutter member pivotally supported on said disc tray, and wherein said urging protuberance is formed in the vicinity of an opening edge of the first opening of said lower shell.

8. A disc cartridge as claimed in claim 5, wherein a pair of said shutter members are pivotally supported on said disc tray, wherein said lower shell is configured to be formed with a pair of said urging protuberances, and wherein said urging protuberances urge respective protruding portions of said shutter members such that said shutter members are pressed against each other.

* * * * *